United States Patent
Street

[11] Patent Number: 6,104,426
[45] Date of Patent: Aug. 15, 2000

[54] STEREO-ENDOSCOPE

[76] Inventor: Graham S. B. Street, Impstone House, Pamber Road, Silchester, Reading, Berkshire, United Kingdom

[21] Appl. No.: 09/157,582

[22] Filed: Sep. 21, 1998

Related U.S. Application Data

[63] Continuation of application No. PCT/GB97/00766, Mar. 19, 1997.

[30]   Foreign Application Priority Data

Mar. 23, 1996 [GB] United Kingdom .................. 9606180

[51] Int. Cl.⁷ .................................................. H04N 13/00
[52] U.S. Cl. ........................... 348/45; 600/166; 600/111; 600/1; 359/375; 359/376; 359/462; 359/463; 359/466; 128/6
[58] Field of Search ............................. 348/45; 359/378, 359/462, 377

[56]   References Cited

U.S. PATENT DOCUMENTS

| | | | |
|---|---|---|---|
| 4,638,800 | 1/1987 | Michel ................................. | 128/303.1 |
| 4,862,873 | 9/1989 | Akihiko et al. . | |
| 5,095,887 | 3/1992 | Leon et al. ................................. | 128/4 |
| 5,459,605 | 10/1995 | Kempf ..................................... | 359/462 |
| 5,522,789 | 6/1996 | Takahashi ............................... | 600/166 |
| 5,557,454 | 9/1996 | Takahashi ............................... | 359/378 |
| 5,742,429 | 4/1998 | Tsumanum ............................. | 359/377 |
| 5,743,846 | 4/1998 | Takahashi et al. ..................... | 600/166 |

FOREIGN PATENT DOCUMENTS

| | | |
|---|---|---|
| 9413189A | 6/1994 | WIPO . |
| 9420875A | 9/1994 | WIPO . |
| 9510218A | 4/1995 | WIPO . |

OTHER PUBLICATIONS

Patent Abstracts of Japan, vol. 095, No. 003, Apr. 28, 1995 and JP 06 331939 A, Dec. 2, 1994.

*Primary Examiner*—Christopher S. Kelley
*Assistant Examiner*—Shawn An

[57]   ABSTRACT

A stereo-endoscope, by which two perspective views of an objective field are viewed, is provided. A divergent optical arrangement, positioned between the object field and two objective lenses, each of which forms a respective image of the object field, reduces the disparity between corresponding points in the two image fields, where such disparity is caused by distortion of the image formed.

7 Claims, 3 Drawing Sheets

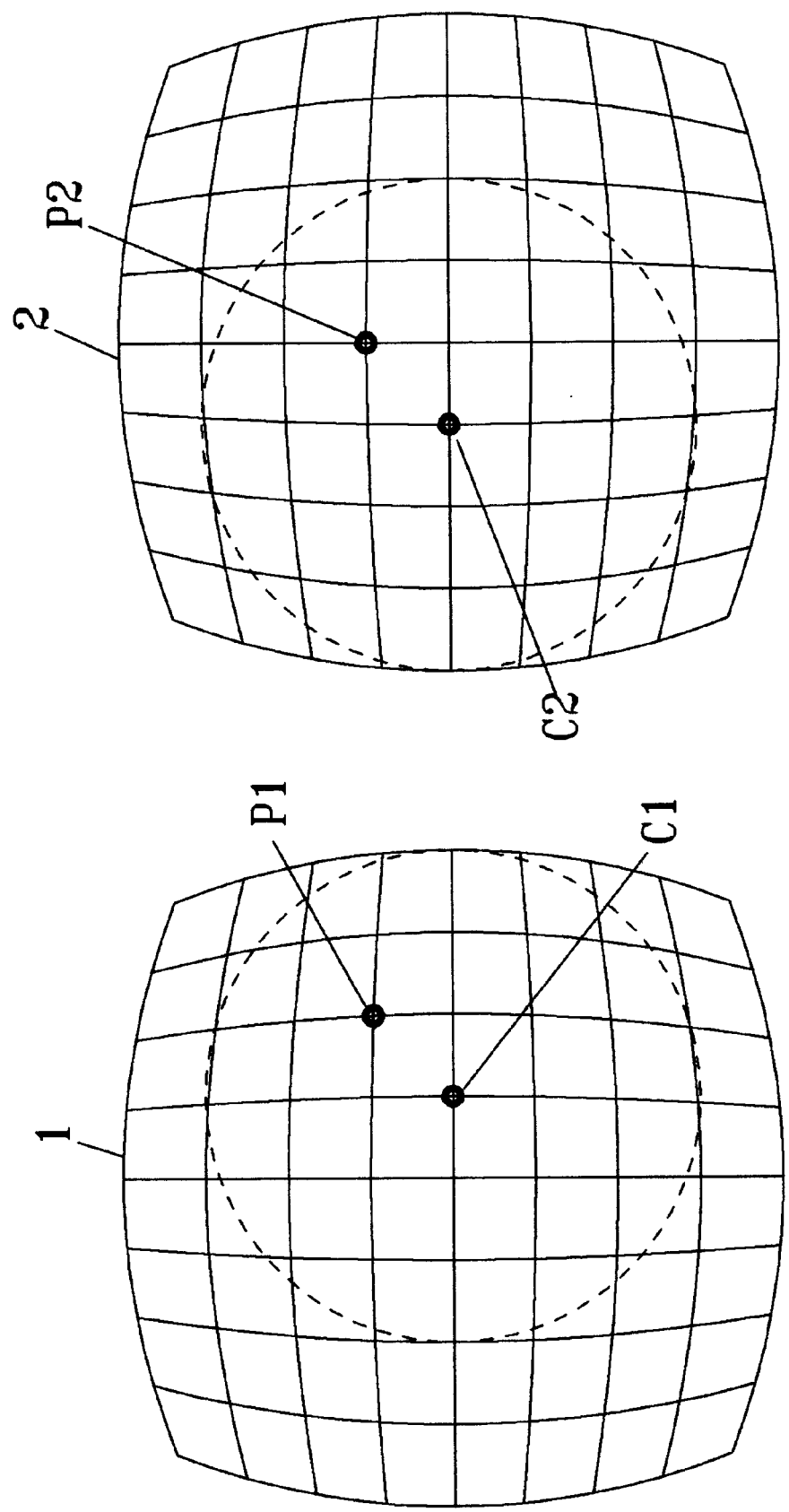

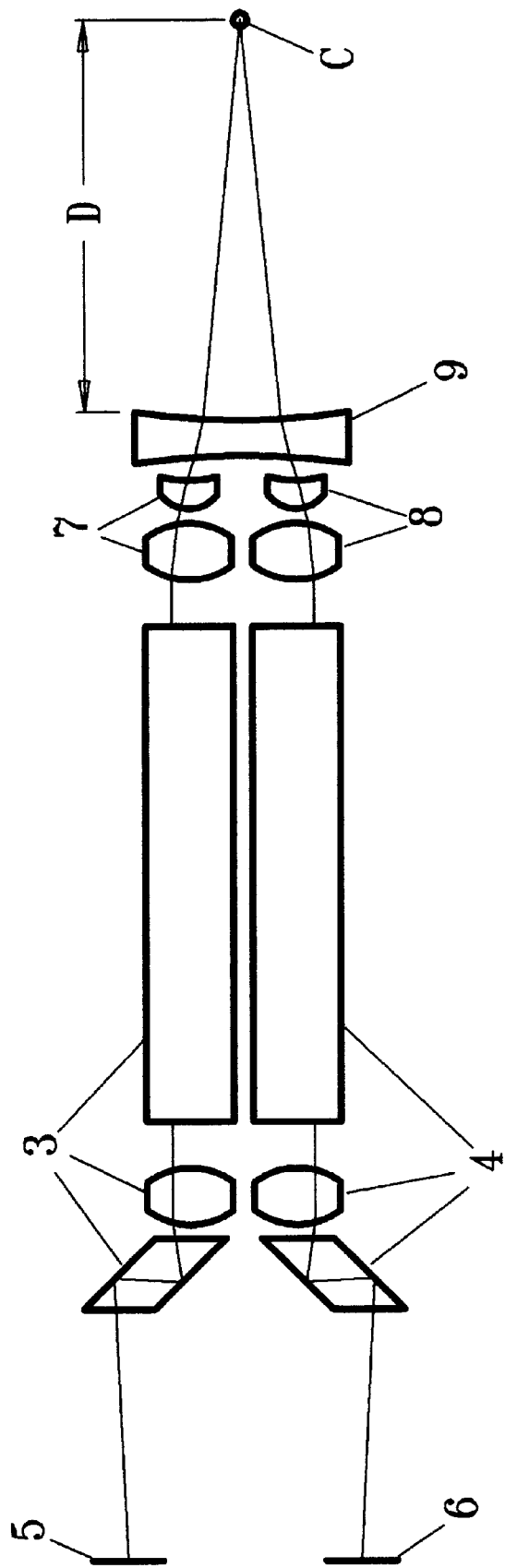
Fig. -2-

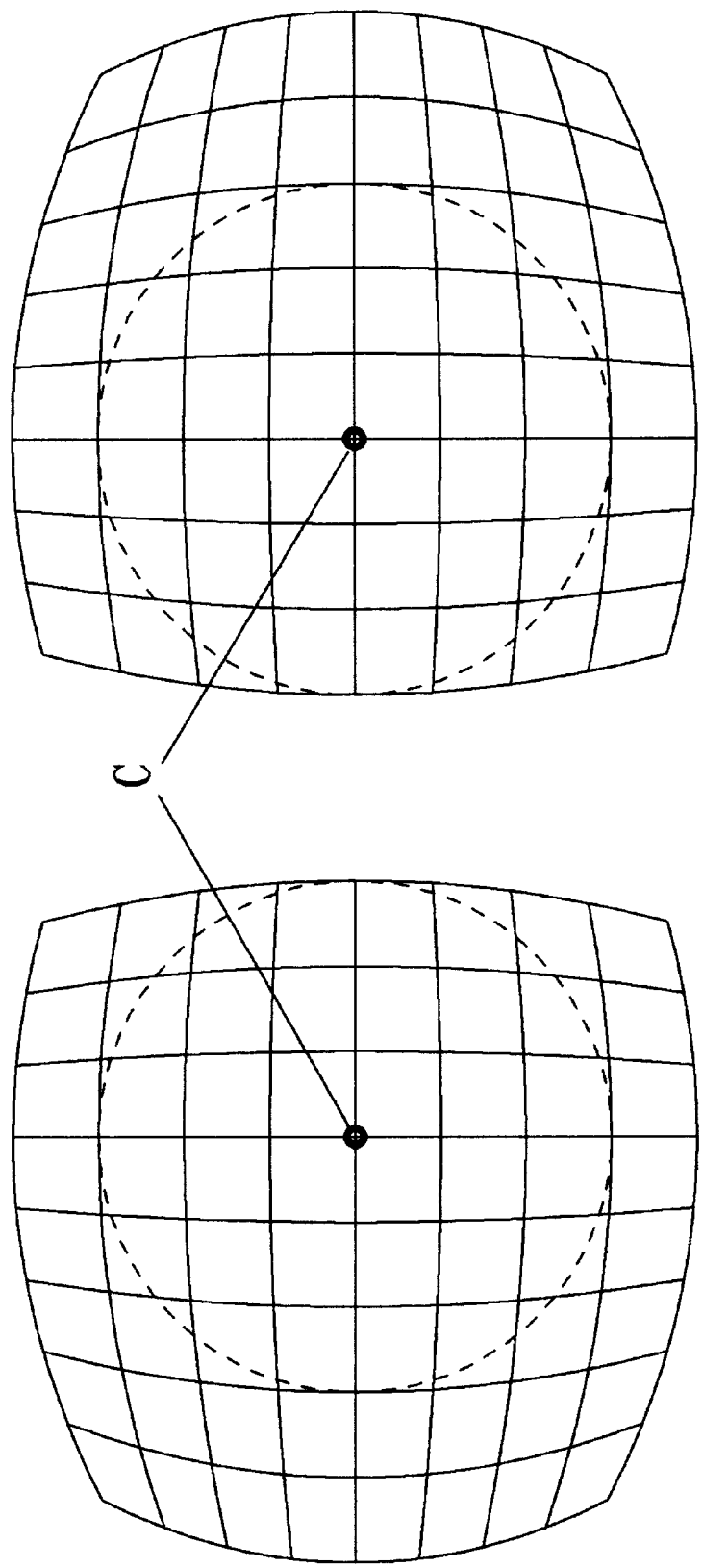
Fig. - 3 -

STEREO-ENDOSCOPE

This application is a Continuation of PCT application no. PCT/GB97/00766 filed on Mar. 19, 1997, which designated the United States and on which priority is claimed under 35 U.S.C. §120, the entire contents of which are hereby incorporated by reference.

This invention is concerned with the field of three-dimensional imaging and particularly with the provision of stereoscopic images through an endoscope by providing different perspective views of an object field to each eye of the observer.

BACKGROUND

In International Patent Application PCT/GB94/00405 (Street) apparatus is described in which a stereoscopic pair of two-dimensional images are combined with the aid of an optical system, so that each eye of an observer sees a different perspective of an object field, but in the same location. This causes the brain to fuse these perspectives into one three-dimensional image. For such fusion to be natural, it is important that the binocular disparity between corresponding points in each of these images is the same for points at a given distance, and that there should be little or no vertical disparity for such corresponding points. A typical stereo-endoscope comprises two optical telescopes, each having an objective, an image relay system, and an eye piece or camera lens. When video cameras are employed to present the images on a stereo monitor, the eye piece becomes the final lens in the chain and forms a suitably scaled image on the CCD sensor of the video camera. In most endoscopic designs, the objective lens has a very short focal length, providing a substantial field of view (say 60°). The camera lens is typically of longer focal length, and the relay system which may comprise a coherent fibre bundle, a series of discrete lens elements, or a graded index lens system, provides a 1:1 magnification of the image formed by the objective, at the object plane of the camera lens. In many designs, the objective lens (typically comprising 2 or 3 elements) will image a flat square grid onto the CCD with some apparent distortion. Equally spaced points, further from the centre are seen as closer together than such points at the centre of the field. There are prior art implementations of stereoscopic viewing apparatus. Two examples are provided here. In International Patent Application PCT/US93/12306 (Kempf) various embodiments of a twin axis endoscope are described. All of these embodiments utilise one or more optical components to converge the two optical axes to cross at a common point at some predefined distance in front of the distal end of the scope. In International Patent Application PCT/US94/11089 (Taylor et al.) a single wide angle lens arrangement is placed in front of a binocular viewing system in order to allow stereoscopic viewing through a small opening at a reasonably wide angle.

When two optical systems are combined side by side in a stereo-endoscope, any point at a finite distance from the distal end of the scope and at the centre of the field of view of one telescope, will be observed at some distance from the corresponding axis of the other telescope. It will be apparent that the spacing of any two points will typically be different for each optical system. This difference can be quite severe towards the edges of the useful field of view. It is found that, deliberate lateral displacement of each CCD, a natural consequence of defining a point at a finite distance of a few centimeters from the objectives as the central point of convergence for the stereo system, accentuates this asymmetry. Neither of the prior art examples referred to above addresses the problem of cross distortion between the two images which are provided to the observer. This invention overcomes the problem by utilising the asymmetric properties of an additional optical element when acting in combination with the two juxtaposed optical systems.

SUMMARY OF THE INVENTION

It is an object of the current invention to minimise local scale differences between the images of pairs of points, corresponding to different perspectives thereof, where such points are substantially equidistant from the view point.

It is a further objective of the invention to minimise the vertical disparity between the two images of any given point.

Thus according to the current invention there is provided a stereo-endoscope for viewing an object field, the endoscope comprising a first and a second objective lens, each of which forms an image of the object field from a different respective view point, and a divergent optical arrangement between the object field and the lenses, wherein the endoscope has a corrected convergence point and the divergent optical arrangement has a length of divergence, so that the divergent optical arrangement is effective to reduce disparity between corresponding points in the two images of the object field.

Preferably the divergent optical arrangement is a divergent lens.

The divergent optical arrangement may comprise prismatic components.

Advantageously, the distance of the divergent optical arrangement from the corrected convergence point is substantially equal to the magnitude of said length of divergence.

In certain embodiments of the invention, the image field, corresponding to the view point of the object field for each respective objective lens and relayed to a respective CCD, has its centre point displaced relative to the optical axis of the respective objective lens.

Typically, the distortion of the image field corresponding to the first objective lens and the distortion compensation provided by said relative displacement thereof with respect to the CCD corresponding thereto is mirror symmetric with respect to the distortion of the image field corresponding to the second objective lens and the distortion compensation provided by said relative displacement thereof with respect to the CCD corresponding thereto.

DESCRIPTION OF PREFERRED EMBODIMENTS

The invention will now be described with reference to FIGS. 1 to 3 in which:

FIG. 1 shows the form of distortion which the invention seeks to control,

FIG. 2 shows diagrammatically an endoscope constructed in accordance with the invention, and FIG. 3 shows the resultant effect of the invention on the distortions of FIG. 1.

In FIG. 1 the left eye image 1 and right eye image 2 of a square grid, as would typically be viewed through two conventional endoscopic telescopes are illustrated. The distortions are slightly exaggerated for the sake of clarity. The region centered on the two images of the same point in the object field, depicted as points C1 and C2 in each respective case, is shown as a dashed line. It will be clear that, when points C1 and C2 are made to be central to the observed image and coincident, by moving each respective CCD accordingly and thereby making C1 and C2 a selected common convergence point, the distance to an off axis point shown as P1 and P2 in the two respective views will be nearer the central point C1 in the left hand view than it is to C2 in the right hand view.

FIG. 2 shows schematically an endoscope constructed in accordance with the invention. Two optical relay systems 3 and 4 transfer a pair of images from the distal end of the endoscope to an image plane, where two corresponding CCD's 5 and 6 are positioned The objective lens groups 7 and 8 each form an image at a first image plane within each respective relay system, and this is typically magnified at the corresponding CCD. It is this magnification which introduces the distortions observed.

The divergent lens 9 requires that the CCD's be moved further off axis than would have been the case without, in order to bring point C to the centre of each. By making this off-set about twice the amount required without lens 9, which means a negative focal length approximately equivalent to the distance D, mirror symmetric distortions are introduced into each image of the grid of FIG. 1 and of a magnitude which makes the resulting total distortions the same with respect to the now corrected common convergence point in each view.

FIG. 3 shows the result of applying the principles outlined to each image field. The grid distortions are skewed, so that the corrected common convergence point C is at the point of symmetry. By achieving this, corresponding points in each view now map correctly to each other without the unwanted disparity that would otherwise arise.

Whereas the divergent optical arrangement of FIG. 2 is a negative lens 9, the desired image distortion compensation may be achieved by placing two optical wedges or prisms side by side with the two narrow ends juxtaposed, each in a respective optical path. In this way, the two prisms combine to form the required divergent optical system and the desired compensation is achieved. Whilst missing the demagnifying property of lens 9, which in itself has little effect on image distortions, such a prismatic divergent system is substantially equivalent to lens 9, in the context of the invention. It provides, for each objective lens, the respective prismatic component of lens 9 that would be encountered by light passing through the optical system.

What is claimed is:

1. A stereo-endoscope for viewing an object field, the endoscope comprising a first and a second objective lens, each of which forms an image of the object field from a different respective view point, and a divergent optical arrangement between the object field and the objective lenses, wherein the endoscope has a corrected convergence point and the divergent optical arrangement has a length of divergence, so that the divergent optical arrangement is effective to reduce disparity between corresponding points at a plurality of locations in the two images of the object field.

2. A stereo-endoscope as claimed in claim I wherein the divergent optical arrangement is a divergent lens.

3. A stereo-endoscope as claimed in claim I wherein the divergent optical arrangement comprises prismatic components.

4. A stereo-endoscope as claimed in claim I in which the distance of the divergent optical arrangement from the corrected convergence point is substantially equal to the magnitude of said length of divergence.

5. A stereo-endoscope as claimed in claim I in which each image field, corresponding to the view point of the object field for each respective objective lens and relayed to a respective CCD, has its centre point displaced relative to the optical axis of the respective objective lens.

6. A stereo-endoscope as claimed in claim 5 in which the distortion of the image field corresponding to the first objective lens and the distortion compensation provided by said relative displacement thereof with respect to the CCD corresponding thereto is mirror symmetric with respect to the distortion of the image field corresponding to the second objective lens and the distortion compensation provided by said relative displacement thereof with respect to the CCD corresponding thereto.

7. A method for viewing a stereo-endoscopic image of an object field which comprises providing two objective lenses for forming respective images of said object field, each from a different respective view point; positioning a divergent optical arrangement intermediate the object field and said objective lenses, wherein the endoscope has a corrected convergence point and the divergent optical arrangement has a length of divergence, so that the divergent optical arrangement is effective to reduce disparity between corresponding points in the two images of the object field.

* * * * *